Patented Feb. 23, 1954

2,670,304

UNITED STATES PATENT OFFICE 2,670,304

MANUFACTURE OF BITUMINOUS EMULSIONS

Paul E. McCoy, San Francisco, Calif., assignor, by mesne assignments, to American Bitumuls & Asphalt Company, San Francisco, Calif., a corporation of Delaware No Drawing. Application October 30, 1950, Serial No. 193,027

11 Claims. (Cl. 106—277)

This invention relates to the manufacture of bituminous emulsions. More particularly, this invention relates to the manufacture of an emulsion containing additives desirably present in the emulsion, but which said additives, if incorporated therein according to common practices, have a marked tendency either to break the emulsion, in whole or in part, or substantially to reduce its stability.

By way of illustration, it is known that when road aggregates are coated with asphalt-in-water type road emulsions, the dried asphalt film formed on the aggregates is often stripped from the aggregates by water action. This stripping action can be prevented by incorporating in the emulsion various additives which insure a firm asphalt-aggregate bond in spite of the stripping properties of the water.

For instance, one additive which is very effective to avoid the stripping from the aggregate of the deposited asphalt film is sodium dichromate.

However, such use of sodium dichromate poses a certain serious difficulty. Asphalt-in-water road emulsions are frequently of the quick-setting variety (ASTM D 401) and must have a high demulsibility (ASTM D 244) and are accordingly very sensitive to electrolytes, foreign matter and the like. The direct addition of useful amounts of sodium dichromate to such emulsions causes them to break or seriously impairs their stability in storage.

The problem of incorporating sodium dichromate in quick-breaking emulsions has been attacked from many angles, such as by using larger amounts of emulsifying and/or stabilizing agents. This approach has the disadvantage of being costly, or converting the quick-setting emulsion to medium setting emulsions (ASTM D 399) or slow setting emulsions (ASTM D 631) or in some instances exceeding the allowable non-asphaltic content of the asphaltic residue.

Also, without success, it has been attempted to overcome the difficulty by numerous variations in the procedure of emulsification, such as by passing three streams to the emulsifying apparatus; namely, liquid asphalt, alkaline water and an aqueous solution of sodium dichromate.

Now I have discovered a method whereby an emulsion can be prepared capable of tolerating the presence of additives of normal emulsion-breaking properties, which emulsion is free of undesirable breakdown and is stable during storage.

My process can be illustrated, as above, in reference to the manufacture of asphalt-in-water road emulsions containing sodium dichromate.

Broadly, my process comprises the steps of adding an electrolyte, such as sodium dichromate, preferably in hot solution form, to a preformed oil-in-water type emulsion, such as a quick-breaking asphalt-in-water emulsion, also preferably hot, and then subjecting the resulting emulsion, while still hot, to a high-speed grinding, shearing action and vigorous agitation, as in a colloid mill.

In accordance with the process of my invention a quick-breaking emulsion of a bituminous substance, for example, asphalt, is prepared by the method of Montgomerie U. S. Patent 1,643,675 or Braun U. S. Patent 1,737,491, according to which, without the use of an emulsifying agent, molten asphalt is emulsified in hot, dilute aqueous caustic alkali solution, the asphalt forming the inner or disperse phase, and the water, the outer or continuous phase. As is well known to those skilled in the art, where the asphalt is not emulsifiable as above, the quick-breaking emulsion may be prepared by the use of a small amount of saponifiable material, such as oleic acid, which with the caustic forms the emulsifying agent.

To the freshly-formed hot emulsion, maintained preferably at a temperature of about 50 to 100° F. above the melting point of the disperse phase thereof, there is added with stirring a hot aqueous solution of the electrolyte, e. g., sodium dichromate, at a temperature of preferably at least about 150° F., the electrolyte solution being added to the emulsion in an amount calculated to give the desired quantity of electrolyte in the finished emulsion. For best results the electrolyte solution is introduced into the emulsion at a point below the surface thereof, such as through a tube extending well below the surface of the emulsion.

Following the addition of the electrolyte to the emulsion, now partially broken and containing grains and shot due to the presence of electrolyte, the emulsion while still hot, that is, at a temperature of at least 150–200° F. is subjected to a shearing, grinding action, together with vigorous agitation, as in a colloid mill. As a result of this action the finished emulsion is of fine and smooth texture, is free from grains and shot, tolerates the presence of the electrolyte, and does not break down during storage.

In carrying out the re-emulsification of the sodium dichromate-treated emulsion, apparatus capable of providing the shearing, grinding action necessary to finely re-disperse the partially coagulated emulsion is employed. Suitable apparatus for this purpose is a colloid mill, such as the beater-type, for example, the Hurrell mill;

the smooth-surface type, for example, the Charlotte mill; the rough-surface type, for example, the Rex mill. These various mills are described on page 556, vol. 1, of the publication, "Asphalts and Allied Substances," 5th edition, by Herbert Abraham.

I have found that in carrying out the invention the step-wise procedure of first forming the emulsion, followed by the addition of the electrolyte and re-emulsification is critical. For example, attempts at a one-step emulsification, as in a colloid mill, of all of the ingredients desired in the finished emulsion have resulted in failure. In such a process the presence of electrolyte either inhibits or prevents emulsification or gives rise to an emulsion which is broken, fails specifications and is commercially unsatisfactory.

On the other hand, by carrying out the process step-wise in accordance with the invention, emulsification is assured by first forming the emulsion in the absence of the electrolyte, and while the subsequent addition of electrolyte does cause a breakdown of the emulsion, such breakdown is local, and not such as to prevent a stable re-emulsification to produce a finished emulsion which is unexpectedly capable of withstanding the presence of electrolyte, heretofore regarded as not feasible to incorporate in emulsions.

In general, the invention is applicable to the addition to oil-in-water emulsions of material which is dispersible in water, that is, to form true solutions or mere suspensions, which material if added directly to the emulsion would damage the same. Preferably contemplated by the invention, however, are water-soluble astringent type materials, such as acids and acidic salts.

Accordingly, in addition to the salts of oxy acids of chromium, other astringent or coagulating type acidic materials, such as salts and acids which would normally injure emulsions if directly incorporated therein are contemplated by the invention. Examples of these materials are, in addition to sodium dichromate: ammonium persulfate, antimony chloride, ferric oxalate, lead acetate, silver nitrate, cobalt chloride, ferric chloride, tin chloride, ferrous chloride, hydrochloric acid, acetic acid, antimony sulfate, copper chloride, ferric nitrate, mercuric chloride, zinc nitrate, copper nitrate, mercuric sulfate, aluminum chloride, cobalt chromate, manganese chloride, mercuric nitrate, titanium chloride, copper acetate, mercuric acetate, ammonium sulfate, mercurous nitrate, nickel chloride, zinc sulfate, aluminum sulfate, bismuth chloride, copper sulfate, ferric sulfate, lead nitrate, magnesium chloride, manganese acetate, ammonium acetate, nickel sulfate, zinc chloride, aluminum acetate, etc.

The amount of solution of electrolyte to be added to the emulsion will of course vary depending on the concentration of the solution, which may vary from about 5 to 50%, preferably between 5 and 15%, and the amount of electrolyte desired to be incorporated in the finished emulsion. Thus, for purposes of providing the emulsion with an adhesion-promoting agent, an amount of electrolyte solution is added to the emulsion to furnish it with about 0.1 to 5%, preferably about 0.3%, by weight of the finished emulsion of the desired adhesion-promoting agent.

While the invention has its chief utility in connection with oil-in-water type emulsions of the quick-breaking type, which are inherently quite sensitive to the addition of foreign agents, other relatively more stable emulsions, such as the medium- and slow-setting emulsions, can often be treated advantageously in accordance with the invention.

The quick-breaking oil-in-water emulsion is prepared from a water-insoluble, water-dispersible, organic thermoplastic bituminous substance, normally solid, semi-solid or a viscous liquid at ordinary atmospheric temperatures. These materials are bitumens, such as petroleum and native asphalts, native mineral waxes, asphaltites; pyrobitumens, such as asphaltic pyrobituminous shales, lignite, peat; pyrogeneous distillates, such as petroleum paraffin, peat paraffin, oil-gas tar, coal tar; pyrogeneous residues, such as blown petroleum asphalts, sludge asphalts, pressure tars, residual oils, oil-gas-tar pitch, wood pitch, etc. Of these materials, petroleum asphalt is most advantageously used and it may be produced by steam refining, by air-blowing, by solvent extraction methods, or by a combination of such methods.

As hereinbefore pointed out, it is now possible by the present invention to prepare a bituminous emulsion containing additives which heretofore have caused the emulsion to break into coarse particles or lumps (shot formation), to yield a non-homogeneous emulsion. A test employed in determining the homogeneity of the emulsion, and the one utilized to obtain the data hereinbefore appearing is the so-called "Sieve Test," described, for example, in ASTM D 244-42.

According to this test, a previously weighed No. 20 sieve, having a 3-inch frame of U. S. Standard Sieve Series, is first wet with a 2% sodium oleate solution, after which there is poured therethrough exactly 1000 g. of the emulsified asphalt. The container and residue on the sieve are then washed thoroughly with the sodium oleate solution until the washings run clear. A previously weighed tin box cover or shallow metal pan of appropriate size to fit over the bottom of the sieve is placed under the sieve and heated for 2 hours in a drying oven whose interior temperature is 220° F., then cooled in a desiccator and weighed. The total weight of the sieve, pan, and residue in grams, less the combined tare weight of the sieve and pan, is the weight of the residue by the sieve test. The percentage of residue in the emulsion is calculated on the basis of this weight. Ordinarily, a satisfactory emulsion will have a sieve test value of not more than 0.10 per cent.

As an illustrative example of the practice of the invention, the following is given:

(a) A quick-breaking asphaltic emulsion was prepared in conventional manner in a propeller mixpot employing the following ingredients in the indicated proportions by weight:

| | Per cent |
|---|---|
| California asphalt of 150/250 penetration | 56 |
| Caustic soda | 0.14 |
| Bentonite clay | 0.35 |
| Water | 43.51 |

In preparing the foregoing emulsion the temperature of the asphalt was about 270° F., and the temperature of the water, about 190° F.

(b) To the still hot emulsion of (a) there was added about 0.3% sodium dichromate in solution form, about 10%, heated to about 190° F.

(c) Immediately after the addition of the sodium dichromate, the so-treated emulsion was passed through a Charlotte colloid mill. The finished emulsion was of smooth, homogeneous texture and remained stable on storage. It analyzed as follows:

| | |
|---|---|
| Residue _____ per cent__ | 56.0 |
| Sieve test (20 mesh) _____ per cent__ | 0.045 |
| Adhesion test _____ per cent__ | 60–70 |
| Demulsibility 35 cc. N/50 CaCl₂___ per cent__ | 99 |
| Viscosity _____ seconds__ | 19 |

The sieve test was performed as described hereinabove, while residue, demulsibility and viscosity were determined in accordance with ASTM D 244–42 specification.

The adhesion test was carried out as follows: 200 g. of dry Standard Massachusetts rhyolite, graded so as to pass entirely through a ¼-inch (No. 3) sieve and to be retained completely on a No. 10 sieve was heated to 300° F. and mixed with 16 g. of emulsion until complete coating resulted. Three 50 g. samples of the coated aggregate were then each spread thinly on a metal can lid and left in an oven for 48 hours at 140° F. Each cured sample was then dropped into 400 cc. of boiling distilled water in a 600 cc. beaker and stirred three minutes at the rate of 60 times a minute, boiling meanwhile being continued. Each beaker was then removed from the heat and, after ebullition had ceased, cold water was run into the beaker through a submerged hose until any film of asphalt on the surface of the water was flushed out. Each sample of aggregate was then removed and placed on absorbent paper and air dried. The dried samples were then inspected visually by an experienced observer to estimate the percentage area coated, uncoated area being deemed that retaining no asphaltic coating. The figures for the three samples were then averaged.

Obviously, many modifications and variations of the invention as hereinabove set forth may be made without departing from the spirit and scope thereof, and therefore only such limitations are to be imposed as are indicated in the appended claims.

I claim:

1. The process of incorporating an electrolyte in a quick-breaking oil-in-water type bituminous emulsion meeting A. S. T. M. specifications D-401, which comprises adding said electrolyte to a hot preformed quick-breaking oil-in-water type bituminous emulsion meeting A. S. T. M. specifications D-401, and then subjecting the so-treated emulsion, while still hot, to a high-speed grinding, shearing action and vigorous agitation, whereby the electrolyte-treated emulsion remains stable during storage and handling.

2. A process substantially as described in claim 1, wherein the bitumen of the hot oil-in-water type emulsion is asphalt, and the additive is incorporated in said emulsion in hot solution form.

3. A process substantially as described in claim 1, wherein the additive is an acid-reacting salt.

4. A process substantially as described in claim 3, wherein the hot oil-in-water type emulsion is a quick-breaking asphalt emulsion, and the acid-reacting salt is incorporated in said emulsion in hot solution form.

5. A process substantially as described in claim 4, wherein the additive is sodium dichromate.

6. A process substantially as described in claim 5, wherein the sodium dichromate is present in an amount of about 0.1 to about 5% by weight of the finished emulsion.

7. The process of incorporating an electrolyte in a quick-breaking oil-in-water type bituminous emulsion meeting A. S. T. M. specifications D-401, which comprises emulsifying hot, molten bitumen in a hot aqueous alkaline solution to produce a quick-breaking oil-in-water type bituminous emulsion meeting A. S. T. M. specifications D-401; adding an electrolyte to said bituminous emulsion while still hot, then subjecting the electrolyte-treated emulsion while still hot, to a high speed grinding, shearing action and vigorous agitation, whereby the electrolyte-treated emulsion remains stable during storage and handling.

8. A process substantially as described in claim 7, wherein the additive is selected from the group consisting of acids and acid-reacting salts, and is added to the emulsion in hot solution form beneath the surface thereof, and the emulsion is an asphaltic emulsion.

9. A process substantially as described in claim 8, wherein the additive is an acid-reacting salt.

10. A process substantially as described in claim 7, wherein the additive is a water-soluble acid-reacting salt.

11. The process of incorporating in a quick-breaking oil-in-water Montgomerie type asphalt emulsion meeting A. S. T. M. specifications D-401, which comprises emulsifying hot, molten asphalt in a hot aqueous alkaline solution by the Montgomerie method to produce a quick-breaking oil-in-water Montgomerie type asphalt emulsion meeting A. S. T. M. specifications D-401; adding a hot solution of sodium dichromate in an amount of about 0.1 to about 5% by weight to said asphalt emulsion while still hot; and then subjecting the sodium dichromate treated emulsion while still hot, to a high speed grinding, shearing action and vigorous agitation, whereby the sodium dichromate-treated emulsion remains stable during storage and handling.

PAUL E. McCOY.

References Cited in the file of this patent

UNITED STATES PATENTS

| Number | Name | Date |
|---|---|---|
| 1,733,495 | Kirschbraun | Oct. 29, 1929 |
| 1,733,497 | Kirschbraun | Oct. 29, 1929 |
| 1,757,083 | Halvorsen | May 6, 1930 |
| 1,988,879 | Steininger | Jan. 22, 1935 |
| 2,055,612 | Robinson | Sept. 29, 1936 |
| 2,099,353 | Smith | Nov. 16, 1937 |

FOREIGN PATENTS

| Number | Country | Date |
|---|---|---|
| 15,100 | Great Britain | 1908 |
| 110,062 | Australia | Mar. 8, 1940 |